Nov. 24, 1959 D. W. GOHEEN ET AL 2,914,568
MAKING DIMETHYL SULFIDE FROM DESUGARED
SPENT SULFITE PULPING LIQUORS
Filed Dec. 6, 1957
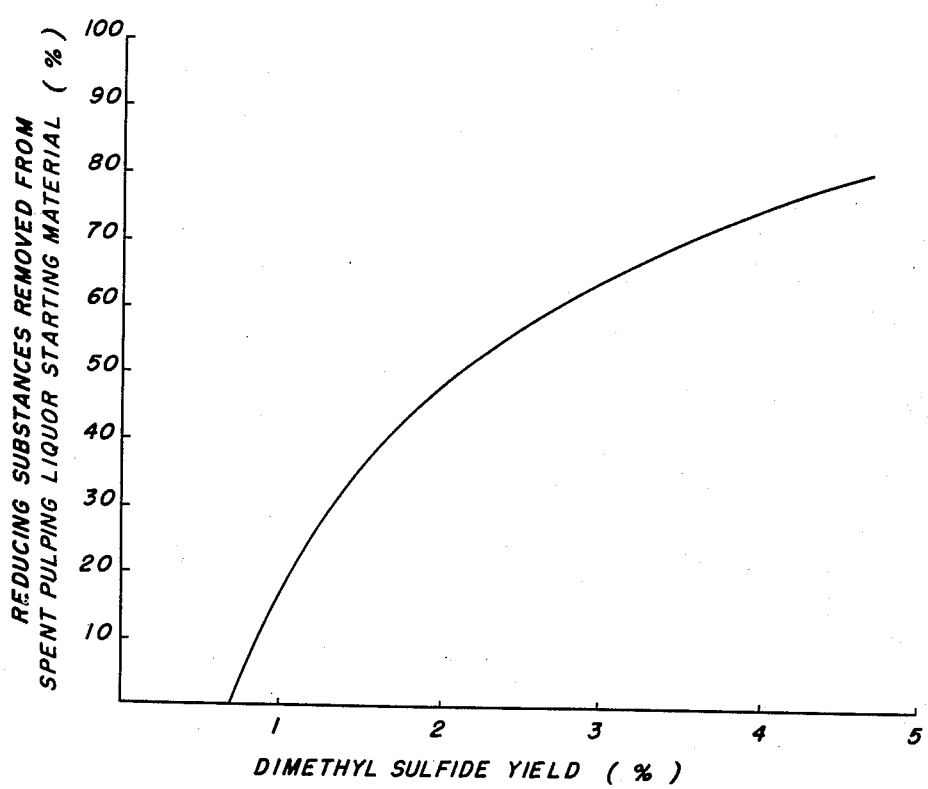
DAVID W. GOHEEN
WILLIAM M. HEARON
MERLE E. CISNEY
JAMES D. WETHERN
INVENTORS
BY
ATTORNEY United States Patent Office 2,914,568
Patented Nov. 24, 1959

2,914,568

MAKING DIMETHYL SULFIDE FROM DE-SUGARED SPENT SULFITE PULPING LIQ-UORS

David W. Goheen, William M. Hearon, Merle E. Cisney, and James D. Wethern, all of Camas, Wash., assignors to Crown Zellerbach Corporation, San Francisco, Calif., a corporation of Nevada Application December 6, 1957, Serial No. 701,119

19 Claims. (Cl. 260—609)

This invention relates to a process of making dimethyl sulfide from desugared spent sulfite pulping liquors, i.e. from such liquors from which part of their content of sugars and other reducing substances have been removed.

Dimethyl sulfide, the end product of the herein described process, is useful as a starting material for the synthesis of various commercially important compounds, as a versatile low boiling solvent, as a sulfur carrier in argricultural and rubber compounds, and as an odorant for addition to odorless gases to allow their detection or tracing.

Methods for preparing dimethyl sulfide from spent pulping liquors are set forth in Hagglund et al., U.S. 2,711,430 and Cisney et al. Serial No. 456,693, filed September 17, 1954, now U.S. 2,816,832, of which this application is a continuation in part. In these procedures the liquor is reacted with an inorganic sulfide or elemental sulfur, respectively, for the conversion of the liquor constitutents to dimethyl sulfide, which then is distilled from the reaction mixture. While these procedures accomplish this conversion successfully when a spent liquor from alkaline pulping is used as a starting material, the overall yields of dimethyl sulfide product are very low when sulfite spent liquor is employed.

Accordingly it is the general object of this invention to provide an improved process for making dimethyl sulfide from spent sulfite pulping liquor in much higher yields than have been attained heretofore. It also is an important object of this invention to provide a process for making dimethyl sulfide inexpensively on a large commercial scale from spent sulfite pulping liquors which are available in large quantities at very low cost.

The manner in which the foregoing and other objects of this invention are accomplished will be apparent from the instant specification and claims considered together with the accompanying drawing consisting of a graph illustrating the effect of desugaring sulfite spent liquor on the yield of dimethyl sulfide obtainable by the presently described process.

The present invention is predicated on the discovery that a primary reason for the low yields of dimethyl sulfide product produced by the aforementioned procedures of Hagglund et al. and Cisney et al. resides in the fact that chemically reducing substances contained in spent sulfite liquors induce undesirable side reactions which reduce materially the final yield of dimethyl sulfide. Such reducing substances consist primarily of reducing sugars, other carbohydrates, and certain lignin sulfonic acids which have a reducing action as determined by the conventional Fehling test for reducing materials. They may be present in the amount of from 15-35% by weight, of the spent liquor solids.

Generally stated, therefore, the herein described process of making dimethyl sulfide comprises removing or degrading at least 10% by weight of the content of chemically reducing substances from a spent sulfite waste liquor, insuring that the pH of the liquor from which the reducing substances have been removed lies above a value of 7, and adding to the liquor from 1-15% by weight, liquor solids basis, of an inorganic sulfur-bearing substance such as elemental sulfur. The resulting mixture then is heated to a temperature of from 180-500° C. for a time sufficient to form a substantial amount of dimethyl sulfide which thereafter is separated by distillation or otherwise.

The sulfide spent pulping liquor which is the starting material for the presently described process may be derived from the pulping of any of the conventional lignocellulose raw materials such as the coniferous species of trees, particularly hemlock, spruce, and white fir; the deciduous species of trees; and other plant materials such as straw, bagasse, etc. These materials in comminuted form are cooked with ammonium, sodium, calcium, or magnesium bisulfite under acid, neutral or alkaline conditions.

In the acid sulfite process where the cooking liquor consists of an aqueous solution of bisulfite together with an excess of sulfur dioxide, the pH of the cooking liquor is from 1.5 to 5. In the so-called bisulfite process, where a smaller proportion of sulfur dioxide is employed, the pH of the liquor is from 5-7. In the neutral or alkaline sulfite processes, an alkaline buffer is added to the liquor so that its initial pH may range from 7-12, depending upon the amount of alkali used.

In a typical instance of the application of the acid sulfite procedure, the lignocellulose is cooked in digesters at 120-155° C. and 65-125 p.s.i. for from 6 to 24 hours. The pressure then is reduced and the cellulose pulp product separated from the spent liquor.

The spent sulfite liquor which comprises the starting material for the present invention comprises principally lignin in the form of salts of ligninsulfonic acids present in amount of from about 50-75% by weight, solids basis. In addition, there is present from about 15-35% by weight solids basis, of wood decomposition products having the common property of reducing Fehling's solution. As noted above, these reducing materials comprise principally reducing sugars and other carbohydrates, together with certain lignin sulfonic acids having a reducing action. It is these materials which must be substantially removed by the process of the present invention in order to secure a high yield of dimethyl sulfide.

Any one of several different procedures may be employed for the indicated purpose. In one such procedure, the spent liquor is steam stripped to remove free sulfur dioxide, cooled to 80° F. and treated with certain nutrients as necessary to add missing essential elements and adjust the pH. These nutrients are commonly ammonium hydroxide, diammonium phosphate and potassium chloride. The liquor is fermented with *Torula utilis*, an organism which has been demonstrated to be the most satisfactory for the production of food yeast, or with other organisms having the common property of altering the reducing substances present in spent sulfite pulping liquor. The yeast is then removed from the liquor by centrifuging.

In another desugaring procedure, sulfite spent liquor is dialyzed to separate about 50% of the lignin sulfonic acids as non-dialyzable material. The dialyzable fraction then is further separated by passing it through two ion exchange columns, the first to deash it and the second to separate the sugars from the lignin sulfonic acids.

In a third desugaring process, the spent liquor is treated with lime to remove sulfur dioxide and the alkaline liquor is treated with air to oxidize various organic substances, i.e. sugars, which are present.

In a fourth such process lime is added to spent liquor first to precipitate calcium sulfite. Then a further quantity of lime is added to precipitate the lignin as basic calcium lignosulfonates which are separated from the sugars by filtration and are then partially neutralized to form calcium lignosulfonates.

The desugared sulfite spent liquor remaining after the manufacture of ethyl alcohol therefrom by fermentation procedures, as well as the liquor remaining after the alkaline oxidation process for the manufacture of vanillin also are suitable as raw materials for the present process.

The modified spent liquors resulting from the foregoing procedures conventionally are termed "desugared spent liquors" and the procedures by which they are treated are conventionally termed "desugaring." Hence, the products and processes are thus denominated herein, although more is involved than a simple removal of the sugar content only of the liquors.

As is indicated in the drawing, in order to increase materially the ultimate yield of dimethyl sulfide obtained, the desugaring operation should be carried on until at least 10%, and preferably at least 40%, by weight, of the reducing substances have been separated from the lignin sulfonic acids or converted to non-reducing degradation products.

Since the solids content of the usual desugared sulfite spent liquor is but 10-20% by weight, it is preferred to concentrate it either before or after desugaring in order to provide a liquor having a solids content of from 30-60% by weight. The concentration of the liquor may be effectuated in any suitable equipment such as conventional atmospheric or vacuum evaporators. If desired, the concentrated liquor then may be further dehydrated by spray drying to a substantially dry powder.

Where the liquor does not have an inherent pH of above 7, preferably of 11-14, it may be treated with alkaline agents as required for pH adjustment to the desired level. Alkaline agents suitable for this use are the hydroxides, oxides or carbonates of the alkali metals, the preferred agent being sodium hydroxide. Any of these agents may be added to the liquor with stirring until the selected pH value has been attained.

After the spent liquor has been subjected to these preliminary treatments for decreasing its content of reducing substances, for adjustment of its solids content and for adjustment of its pH, it is mixed with a predetermined quantity of an inorganic sulfur bearing substance suitable for conversion of the lignin sulfonic acids to reaction products including dimethyl sulfide. A diversity of inorganic sulfur bearing materials may be used for this purpose, as long as they are soluble in aqueous alkaline solutions and possess the capacity to convert lignin methoxyl to dimethyl sulfide. Examples are elemental sulfur; the water-soluble sulfides, e.g. the alkali metal sulfides including sodium sulfide and potassium sulfide; ammonium sulfide; hydrogen sulfide; the water-soluble thiosulfates, particularly sodium thiosulfate; the water-soluble polysulfides, particularly sodium polysulfide; calcium polysulfide; and the water-soluble hydrosulfides, particularly sodium hydrosulfide. Elemental sulfur, sodium sulfide, or mixtures thereof are preferred members of the foregoing group.

Although the quantity of the sulfur bearing substance to be added to the spent liquor is somewhat variable, depending upon the nature and identity of the substance and of the spent liquor employed, sufficient to furnish from 1-15% by weight sulfur, based on the weight of the spent liquor solids, is generally suitable. The preferred amount is sufficient to provide from 3-10% by weight of sulfur, liquor solids basis.

The mixture of spent liquor and sulfur bearing material is reacted in a heated vessel with or without means for agitating its contents. Preferably, the vessel is closed so that the reaction may be carried out under pressure.

The reaction is carried out under conditions calculated to produce a maximum yield of dimethyl sulfide in minimum time with minimum production of undesirable by-products. In general, it should be carried out at a temperature from 180-500° C., preferably from 200-300° C. The reaction time may vary from a period of but a few seconds at elevated temperature to one of a few hours at lower temperatures. In general, a time period of from 5-60 minutes is adequate when a temperature of from 200-300° C. is employed.

After the reacting materials have been maintained at the indicated temperature for the indicated time period, the vaporous product may be vented into a condenser in a closed system. Thereupon the vapor is condensed to form a two-phase product comprising dimethyl sulfide and water. The upper or dimethyl sulfide layer then may be separated, dried and/or fractionally distilled to purify it.

The process of the present invention is illustrated further by the following examples:

*Example 1*

500 grams of sulfite spent liquor derived from pulping a mixture of western hemlock and white fir by the ammonium base acid sulfite process was desugared by fermentation with an organism of the genus Pseudomonas until its content of reducing substances had been reduced from an original value of 21% to 4.7% by weight, liquor solids basis, i.e. until 78% of the reducing substances had been removed.

The desugared liquor was concentrated to a solids content of 44.2%. Its pH then was adjusted from an original value of 6.8 to one of 9.5. Thereafter 25 grams of technical sodium sulfide (60% $Na_2S$) and 4.5 grams elemental sulfur were added to the liquor. This corresponded to a sulfur use of 4.9% liquor solids basis. The pH after the addition of the sulfur bearing materials was 13.

The resulting mixture was placed in a 1-liter stainless steel autoclave, heated to a temperature of 240° C. for 2 hours and maintained at this temperature for ten minutes. Thereafter the vapors were vented from the system into a condenser with attached cooled receiving vessel. The condensed product separated into two layers. The upper dimethyl sulfide layer was decanted, dried over anhydrous sodium sulfate and filtered. It was of good quality and weighed 10.2 grams, representing a yield of 4.6% dimethyl sulfide, solids basis. The residue in the reactor was fluid and pumpable.

*Example 2*

This example illustrates the application of the presently described process wherein a lesser amount of reducing substances are removed prior to the dimethyl sulfide converting step than was used in Example 1.

Following the general procedure outlined in Example 1, 500 grams ammonium base sulfite waste liquor was desugared until its original content of 21% by weight reducing substances had been decreased to 10.2% by weight thereof. This represented a 51.5% removal of reducing substances.

The resulting liquor was concentrated to a solids content of 46.5% and thereafter 25 grams technical sodium sulfide (60% $Na_2S$) and 4.5 grams elemental sulfur were added. This corresponded to a sulfur use of 4.6%, solids basis. The pH of the mixture was adjusted to 13 by the addition of sodium hydroxide after which the mixture was heated to 240° C. over a period of two hours, maintained at this temperature for 10 minutes and distilled.

The yield of dimethyl sulfide was 6 grams, corresponding to a 2.6% yield based on the liquor solids. The residue in the reactor was fluid and pumpable.

*Example 3*

This example illustrates the application of the present process to a spent liquor containing a relatively high amount of reducing substances.

500 grams of 47.5% solids ammonium base sulfite spent liquor was desugared in the same manner as in Example 1, decreasing its content of reducing substances from an original level of 21% to a level of 13.8% by weight, solids basis. This corresponds to a removal of 34.2% by weight of the reducing substances.

The desugared mixture was alkalized with sodium hydroxide to a pH of 8.5, and 25 grams of sodium sulfide (60% $Na_2S$) and 4.5 grams sulfur added. The pH of the resulting mixture was 13.1 and the total amount of sulfur bearing substances present, calculated as elemental sulfur, was 4.5% by weight, solids basis.

The mixture was heated to 240° C. and maintained at this temperature for 10 minutes after which it was distilled to give a yield of 3.5 grams of dimethyl sulfide. This corresponds to a yield of 1.5% by weight, based on the liquor solids. The residue in the reactor was a thick fluid but still pumpable.

*Example 4*

This example illustrates the application of the herein described procedure to the production of dimethyl sulfide from sulfite spent liquor which has been desugared by treatment with lime.

A 40% solids aqueous solution of calcium lignosulfonate was prepared from calcium base sulfite spent liquor by precipitation with lime, thereby separating the ligninsulfonates from all but about 4% of the reducing substances (80% removal) followed by neutralization with sulfuric acid to a pH of about 7. To 500 grams of the resulting solution there was added sufficient sodium hydroxide to adjust the alkalinity to a pH of 13.5. Thereafter 8.7 grams of elemental sulfur was mixed in, this corresponding to a use of 4.35% of sulfur, liquor solids basis.

The mixture was heated in a closed autoclave to 240° C. over a period of 90 minutes, maintained at this temperature for 10 minutes and distilled. The yield of dimethyl sulfide was 5.1 grams, or 2.6% based on the liquor solids. The residue in the autoclave was fluid and suitable for pumping.

*Example 5*

This example illustrates the application of the herein described procedure using an increased amount of added sulfur bearing material.

To 500 grams of the same pH 13.5 liquor as was employed in Example 4 was added 17.4 grams of elemental sulfur. This corresponds to a sulfur use of 8.7%, liquor solids basis. The mixture was heated in the manner set forth in Example 4. The condensed vapor yielded 9.2 grams (4.6% yield) of dimethyl sulfide. The residue in the autoclave was fluid and pumpable.

*Example 6*

This example illustrates the application of the herein described process to a calcium base sulfite spent liquor using a mixture of sodium sulfide and elemental sulfur as the sulfur bearing materials.

500 grams of the same desugared sulfite spent liquor employed in Example 4 was treated with 20 grams sodium sulfide (60% $Na_2S$) and 4 grams of sulfur. Sufficient sodium hydroxide to adjust the pH value of the liquor to 13.5 was added. The resulting mixture was heated in the same manner as described in Example 4 and yielded 7 grams of dimethyl sulfide. This corresponded to a yield of 3.5% dimethyl sulfide, liquor solids basis. The autoclave residue was fluid and pumpable.

*Example 7*

This example illustrates the application of the presently described procedure to a spent liquor desugared by alkaline air oxidation.

Desugared sulfite spent liquor having a solids content of 45% was prepared by alkalizing ammonium base sulfite spent liquor with sodium hydroxide to a pH value of about 12, heating the mixture to a temperature of about 70° C. and passing air through the liquor until approximately 90% of its original content of reducing substances had been converted to non-reducing products. 500 grams of this desugared product was mixed with 25 grams of technical grade sodium sulfide (60% $Na_2S$), 4.5 grams elemental sulfur and sufficient sodium hydroxide to adjust the pH to 13.5. The total amount of sulfur bearing substances employed calculated as elemental sulfur was thus 4.75%, liquor solids basis.

The mixture was heated in a manner similar to that described in Example 4. The yield of dimethyl sulfide was 5.9 grams, or 2.6% liquor solids basis. The residue in the vessel was a thick, pumpable fluid.

Thus it will be apparent that by the present invention we have provided a process for making dimethyl sulfide which is effective in converting the constituents of sulfite spent liquor into a yield of dimethyl sulfide which is markedly higher than those obtained by the procedures of the prior art. Since approximately 2 million tons of sulfite spent liquor solids are produced annually in the United States, this improvement makes potentially available a vastly increased total quantity of dimethyl sulfide for its various commercial applications.

The process is applicable furthermore, to liquors which have been desugared by any of the common procedures and thus makes use of a readily available, low cost starting material. Furthermore, it may be incorporated into the conventional sulfite pulp mill system for recovering various chemical products, or for manufacturing phenolic resins, tanning materials, dispersing agents, etc.

Having thus described our invention in preferred embodiments, we claim as new and desire to protect by Letters Patent:

1. A process of making dimethyl sulfide which comprises decreasing the content of chemically reducing substances in sulfite spent pulping liquor by at least 10% by weight, solids basis; insuring that the pH of the resulting liquor is above 7; adding to the resulting alkaline liquor from 1–15% by weight, based on the liquor solids, of sulfur in the form of an inorganic sulfur-bearing substance comprising at least one member of the group consisting of elemental sulfur and the water-soluble sulfides, thiosulfates, polysulfides and hydrosulfides; heating the mixture to a temperature of from 180–500° C.; maintaining the mixture at 180–500° C. for a time sufficient to form a substantial amount of dimethyl sulfide; and thereafter separating the dimethyl sulfide product from the mixture.

2. The process of claim 1 wherein the reducing substance content of the sulfite spent liquor is decreased by bacterial fermentation.

3. The process of claim 1 wherein the reducing substance content of the sulfite spent liquor is decreased by ion exchange and dialysis.

4. The process of claim 1 wherein the reducing substance content of the sulfite spent liquor is decreased by oxidation with oxygen containing gases in alkaline media.

5. The process of claim 1 wherein the reducing substance content of the sulfite spent liquor is decreased by lime precipitation of the ligninsulfonic acids contained in the liquor and separation of the resulting calcium lignosulfonates from the reducing substances.

6. The process of claim 1 wherein the sulfite spent liquor has a solids content of from 30–60% by weight.

7. The process of claim 1 wherein the reducing substance content of the liquor is decreased by at least 40% by weight.

8. The process of claim 1 wherein the pH of the liquor is 11–14.

9. The process of claim 1 wherein the amount of sulfur in the form of the inorganic sulfur-bearing substances is from 3–10% by weight, based on the liquor solids.

10. The process of claim 1 wherein the inorganic sulfur bearing substance comprises sodium sulfide.

11. The process of claim 1 wherein the inorganic sulfur bearing substance comprises elemental sulfur.

12. The process of claim 1 wherein the mixture is heated to and maintained at a temperature between 200° C. and 300° C.

13. The process of making dimethyl sulfide which comprises decreasing by at least 10% by weight the amount of chemically reducing substances contained in sulfite spent liquor, concentrating the resulting desugared liquor to a solids content of from 30–60% by weight, insuring that the pH of the resulting liquor is between 11 and 14; adding to the liquor from 3–10% by weight, based on the liquor solids, of sulfur in the form of an inorganic sulfur bearing substance comprising at least one member of the group consisting of elemental sulfur and the water-soluble sulfides, thiosulfates, polysulfides, and hydrosulfides; heating the resulting mixture to a temperature of 200–300° C.; maintaining the mixture at 200–300° C. for a time sufficient to form a substantial amount of dimethyl sulfide; and thereafter separating the dimethyl sulfide from the mixture.

14. The process of claim 13 wherein the inorganic sulfur bearing substance comprises sodium sulfide.

15. The process of claim 13 wherein the inorganic sulfur bearing substance comprises elemental sulfur.

16. A process of making dimethyl sulfide which comprises providing desugared sulfite spent liquor from which at least 10% by weight of its content of reducing substances has been removed, insuring that the pH of the liquor is above 7, adding to the liquor from 1–15% by weight based on the liquor solids, of sulfur in the form of an inorganic sulfur bearing substance comprising at least one member of the group consisting of elemental sulfur and the water-soluble sulfides, thiosulfates, polysulfides and hydrosulfides; heating the resulting mixture to a temperature of from 180–500° C.; maintaining the mixture at 180–500° C. for a time sufficient to form a substantial amount of dimethyl sulfide; and thereafter separating the dimethyl sulfide product from the mixture.

17. The process of making dimethyl sulfide which comprises providing desugared sulfite spent liquor from which at least 40% by weight of its content of reducing substances has been removed and having a solids content of from about 30% to 60% by weight, insuring that the pH of the liquor is between 11 and 14; adding to the liquor from 3% to 10% by weight, based on the liquor solids, of sulfur in the form of an inorganic sulfur-bearing substance comprising at least one member of the group consisting of elemental sulfur and the water-soluble sulfides, thiosulfates, polysulfides, and hyrdosulfides; heating the resulting mixture to a temperature of from 200–300° C., maintaining the mixture at 200–300° C. for a time sufficient to form a substantial amount of dimethyl sulfide and thereafter separating the dimethyl sulfide product from the mixture.

18. The process of claim 17 wherein the inorganic sulfur-bearing substance comprises elemental sulfur.

19. The process of claim 17 wherein the inorganic sulfur-bearing substance comprises sodium sulfide.

References Cited in the file of this patent

UNITED STATES PATENTS 2,711,430    Hagglund et al.           June 21, 1955